US008678150B2

(12) United States Patent
Andre

(10) Patent No.: US 8,678,150 B2
(45) Date of Patent: Mar. 25, 2014

(54) AERIAL ASSEMBLY FOR SUPPLYING ELECTRICAL POWER TO A GROUND VEHICLE PROVIDED WITH AN UPPER COLLECTING STRUCTURE

(76) Inventor: Jean-Luc Andre, Molsheim (FR)

( * ) Notice: Subject to any disclaimer, the term of this patent is extended or adjusted under 35 U.S.C. 154(b) by 105 days.

(21) Appl. No.: 13/138,594

(22) PCT Filed: Mar. 9, 2010

(86) PCT No.: PCT/FR2010/000195
§ 371 (c)(1),
(2), (4) Date: Sep. 9, 2011

(87) PCT Pub. No.: WO2010/103202
PCT Pub. Date: Sep. 16, 2010

(65) Prior Publication Data
US 2012/0111682 A1    May 10, 2012

(30) Foreign Application Priority Data
Mar. 9, 2009  (FR) ...................................... 09 01055

(51) Int. Cl.
*B60L 5/42*   (2006.01)
*B60M 1/08*   (2006.01)
*B60M 1/36*   (2006.01)

(52) U.S. Cl.
USPC .......................................... 191/40; 191/33 R

(58) Field of Classification Search
USPC ......... 191/6, 32, 40, 41, 43, 42, 44, 35, 22 R, 191/33 R; 248/324; 320/104, 109; 180/2.1
See application file for complete search history.

(56) References Cited

U.S. PATENT DOCUMENTS

| | | | | | |
|---|---|---|---|---|---|
| 964,953 | A | * | 7/1910 | Clark | 191/34 |
| 1,164,633 | A | * | 12/1915 | Detwiler | 191/40 |
| 2,436,089 | A | * | 2/1948 | Birch | 191/41 |
| 5,134,254 | A | * | 7/1992 | Musachio | 191/6 |
| 7,999,506 | B1 | * | 8/2011 | Hollar et al. | 320/104 |
| 8,324,858 | B2 | * | 12/2012 | Hill et al. | 320/109 |

FOREIGN PATENT DOCUMENTS

| | | |
|---|---|---|
| FR | 2910391 | 6/2008 |
| GB | 2256178 | 2/1992 |
| WO | WO 01/72547 | 4/2001 |

* cited by examiner

*Primary Examiner* — Mark Le
(74) *Attorney, Agent, or Firm* — Law Offices of Steven W. Weinrieb

(57) ABSTRACT

An electrical assembly for a ground vehicle moving along a lane of a road comprises an elevated support, an arm extending transversely across the lane of the road, and a movable portion upon the arm which is moved from a lowered unpowered rest position to a raised powered rest position when a ground vehicle engages the movable portion of the arm. Electrical contacts are spaced from each other so as not to conduct electricity when the movable portion of the arm is disposed at the lowered position and are disposed in contact with each other when the movable portion of the arm is disposed at the raised position.

24 Claims, 7 Drawing Sheets

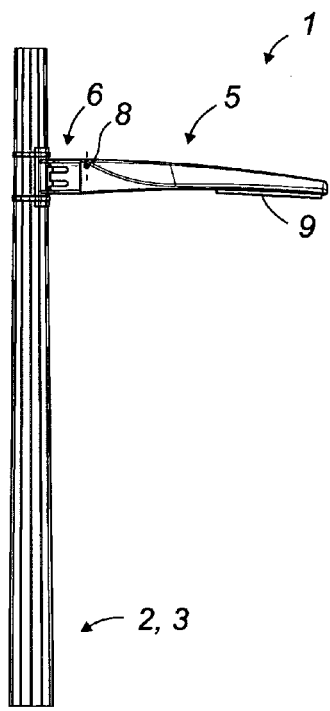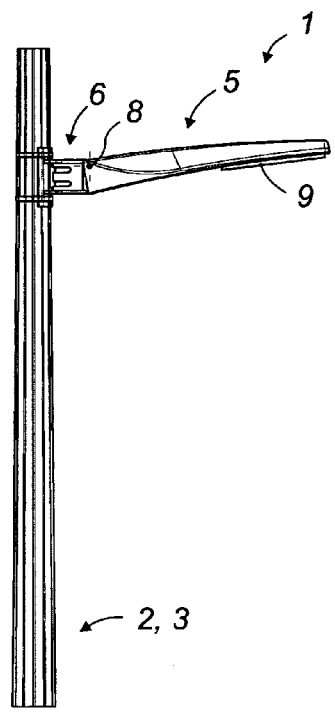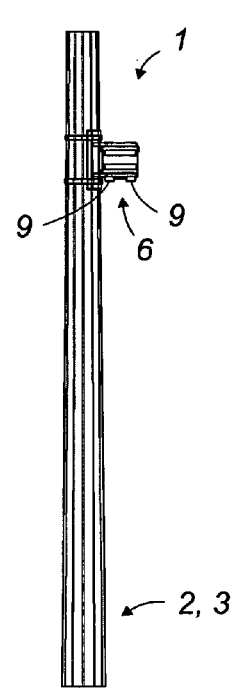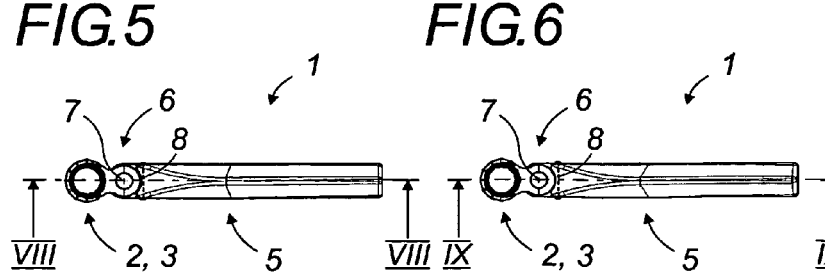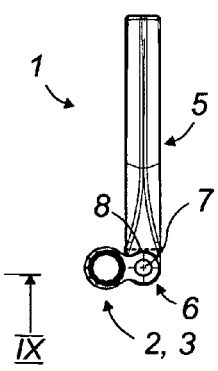

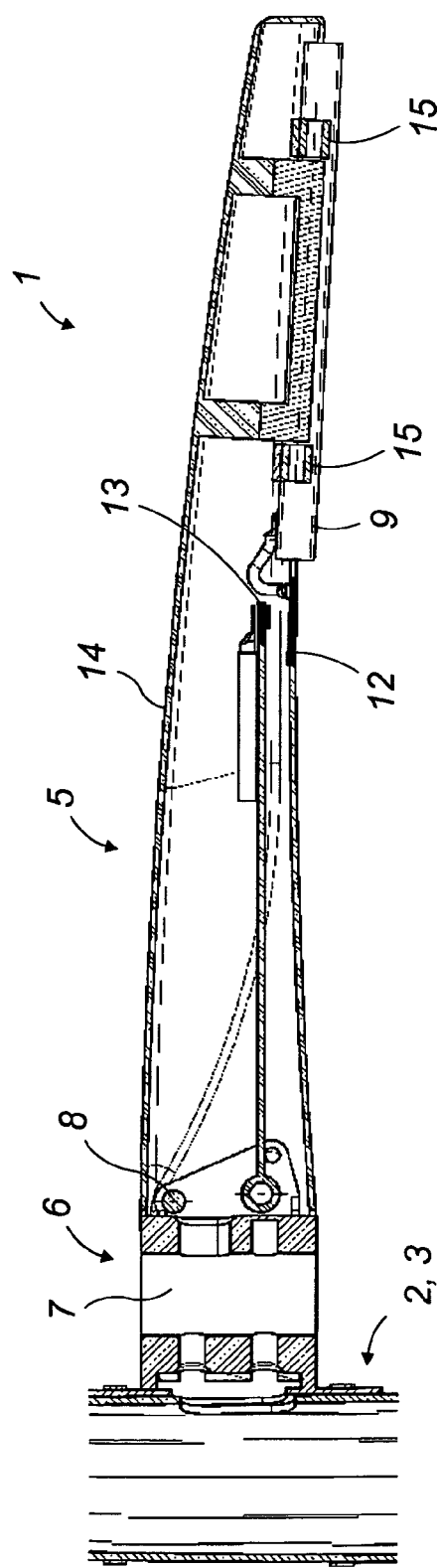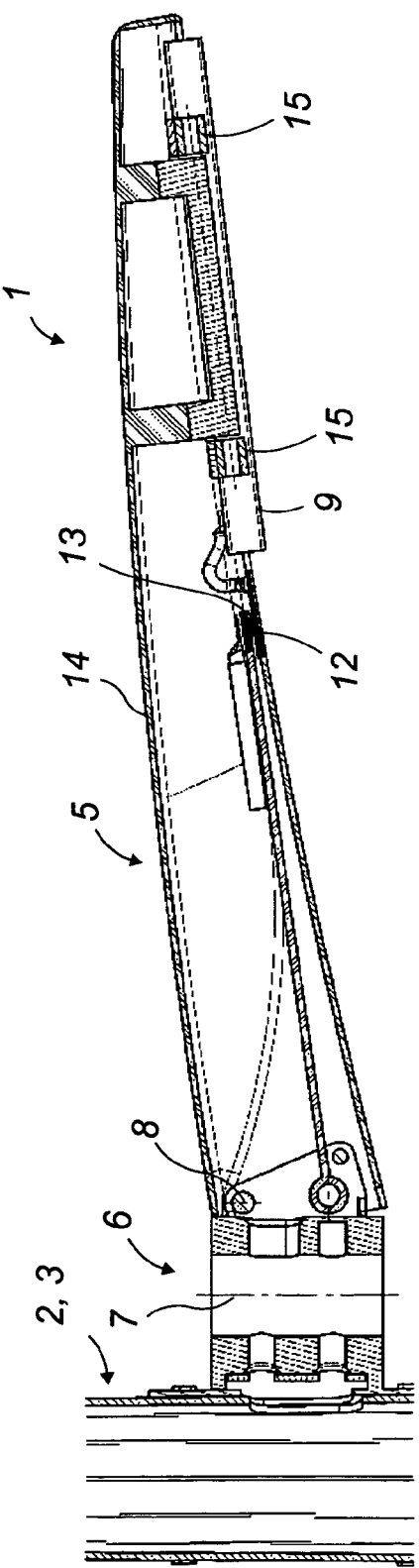

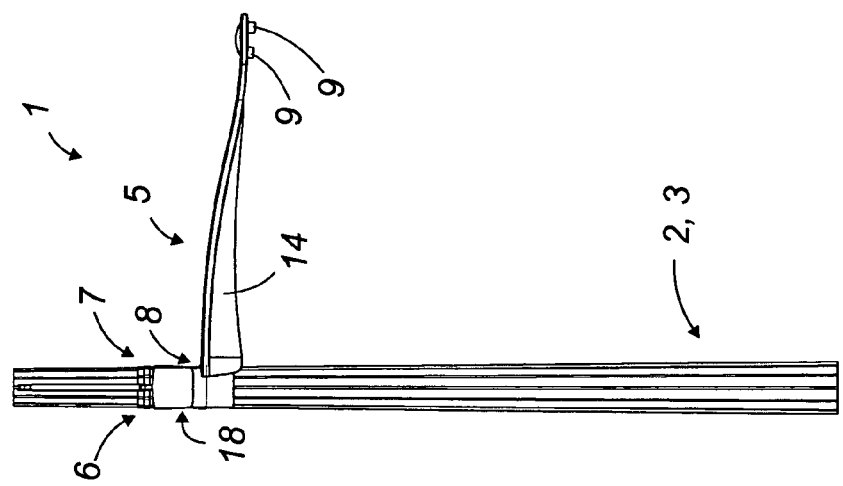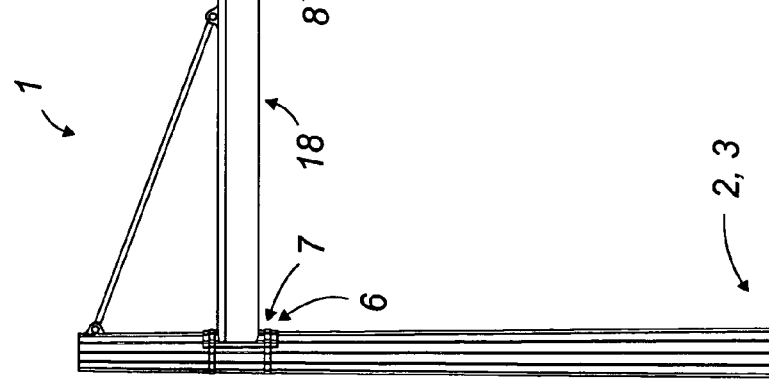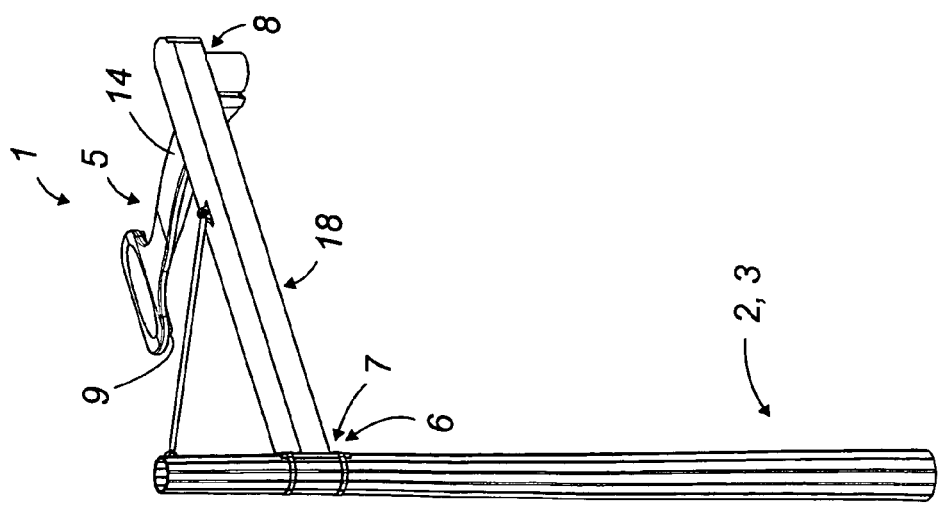

AERIAL ASSEMBLY FOR SUPPLYING ELECTRICAL POWER TO A GROUND VEHICLE PROVIDED WITH AN UPPER COLLECTING STRUCTURE

The present invention relates to a hinged aerial assembly comprising one or more pole pieces functioning as friction members for supplying electrical power to an electric ground vehicle having an upper roof structure for receiving the electrical power.

One particular embodiment relates to an electricity-supplying arm mounted pivotally on a pole, a mast, a façade or any fixed support.

The present invention is intended to act as an aerial assembly for supplying electrical power to an electric ground vehicle equipped with an upper roof structure for collecting the electrical power.

The vehicle passes underneath the aerial assembly for supplying electrical power, and it is by the sliding contact of at least one of the pole pieces functioning as friction member(s) with the upper linear conductive part of the roof structure that the electrical power is input to the vehicle for movement thereof, after storage if necessary.

These means also function while the vehicle is stationary. In this dormant case, contact of the pole piece or pieces with the upper roof structure of the vehicle for collecting the power is sufficient for power transfer to take place.

The present Applicant and its inventors have developed a new electrical supply system for an electric vehicle, wherein the vehicle is not equipped with a pantograph or any analogous collecting system having a complex structure and occupying considerable space on the roof.

According to this original system, the vehicle has an upper roof structure provided with at least one collecting element extending substantially over the entire length of the vehicle. Electricity-supplying means are provided locally along the road over which the vehicle circulates. These electricity-supplying means are each provided with one or more electricity-supplying friction members that make sliding or dormant contact with the upper roof structure of the vehicle in order to supply it with the electrical power that it needs for its movement and its operation.

Over this section of road, the spacing between each means for supplying the system is provided so that the roof structure of the vehicle assuring collection of the electrical power is continuously in contact with at least one electricity-supplying friction member. In the case of a ground vehicle with energy storage, the spacing may be greater.

These supply means also function when the vehicle is stationary. However, it is necessary that the pole piece or pieces be in contact with the upper collecting structure of the vehicle in order for power transfer to take place.

The electricity-supplying means may be supported by poles, by lampposts, by taut cables and in general by any means with which they can be placed and fixed in height. Similarly, these electricity-supplying means are generally carried by an assembly with which the friction members can be suspended in cantilever manner above the passage space of the electric vehicle.

It is known that aerial electricity-supplying means such as catenaries and high-tension cables generally constitute a danger in the urban environment. In fact, any person coming into contact with one of the live elements of these electricity-supplying means is at risk of a serious accident that may cause death.

In addition, this aerial line may become a nuisance for intervention by firemen or for any other intervention necessitating means for lifting or access to an upper level.

Safety necessitates protective means that prevent access to the electrical contacts or that cut the electrical voltage outside collection phases, so as to avoid any risk of accident.

The object of the invention is to provide a vehicle with an original aerial means for supplying electrical power while guaranteeing complete electrical safety outside collection phases.

In addition, in the case in which the electric vehicle is a road or urban vehicle, the presence of high assemblies above the road or above the highway may constitute an obstacle for higher or other vehicles. It would be advantageous for these assemblies to be designed such that they can be deflected to clear the space necessary for passage of higher mobile units.

According to the invention, there is provided a movable or deformable aerial electricity-supplying assembly comprising one or more friction members automatically powered off when the electricity-supplying assembly is in rest position and powered on, meaning they are in the state of being supplied with electrical power, when the assembly or a part thereof is in supplying position, or in other words when the vehicle is passing underneath the supply assembly. To change over into supply position, it is raised mechanically and automatically, for example, by the upward ramp of the leading end of the upper roof structure of the vehicle.

To solve this technical problem, the invention provides an aerial electricity-supplying assembly, to be disposed close to a road where a ground vehicle circulates or is stationary, which is intended to supply electrical power temporarily to this ground vehicle while it is passing by or stationary. This assembly is mounted on a fixed base, such as a pole, a column, a façade or other structure. It comprises one or more pole pieces for electrical contact by dormant or sliding friction, intended to come into contact for delivery of electrical power with at least one electricity-collecting element of a collecting structure carried by the upper part of the ground vehicle.

According to the invention, this supply assembly comprises the following means:

a fixed part functioning as support;
a part that can be moved or deformed under the effect of a mechanical constraint caused by the arrival of the vehicle or by its presence facing the supply assembly;
one or more friction members carried by the movable or deformable part in the form of one or more pole pieces extending in a plane substantially perpendicular to the road;
a link between the fixed part and the movable or deformable part of the assembly, provided for automatic displacement of the friction members between a rest position in the absence of contact between the friction members and the collecting structure carried by the vehicle, and an electricity-supplying contact position when the friction members are in contact with the collecting structure carried by the vehicle during the presence of the moving or stationary vehicle facing the supply assembly and vice versa;
an electrical termination assembly for automatically supplying the friction members, which supplies the friction members only upon arrival of the vehicle or during its presence facing the supply assembly.

Depending on the variants, the movable or deformable part of the supply assembly may tilt or cause tilting around an axis substantially parallel or perpendicular to the road.

This movable or deformable part is preferably constituted by a head carrying the friction member or members and prolonged by a rigid or deformable link up to the junction with the fixed base.

The movable or deformable part may be of the elastic effect type with downward return and, for example, may comprise a leaf spring.

According to a preferred embodiment, the link between the movable or deformable part and the fixed part comprises a hinge, which preferably forms a pivoting means for displacement of the movable or deformable part of the electricity-supplying assembly, causing a vertical tilting movement around an axis substantially parallel to the road.

Preferably, the electrical termination assembly for automatic supply comprises electrical supply terminals housed in the movable or deformable part of the supply assembly. This electrical termination assembly may also comprise a means for powering and for cutting the power according to the presence or absence of the vehicle facing or close to the electricity-supplying assembly.

According to one embodiment of the invention, the assembly for delivering electrical power according to the invention is a movable or deformable arm provided with a movable or deformable part guided or constrained in supply position by an external means or by the front ramp of the upper roof structure of the vehicle comprising the electricity-collecting means when the front part thereof passes underneath the electricity-supplying arm. According to one variant, this movement automatically powers the friction member or members of the supply means in order to transfer electrical power to the vehicle through its upper roof structure.

After passage of the vehicle, the movable or deformable part of the supply assembly, which is no longer forced upward, returns to its rest position in which the friction member or members are automatically no longer powered.

By longitudinal axis there is understood an axis substantially parallel to the direction of movement of the vehicle, while by transversal axis there is understood an axis substantially orthogonal to the direction of movement of the vehicle.

By virtue of the invention, the external and accessible parts of the electricity-supplying means are powered only during passage of the vehicle or while it is stationary underneath the electricity-supplying assembly, thus avoiding any risk of accident by electrocution. In addition, this is a device with positive safety, thus enhancing its safety character even more.

The electricity-supplying assembly of the invention may also be deflectable or retractable, for example by horizontal or vertical pivoting, thus making it possible to clear the highway or road over its entire height. This deflection of the electricity-supplying assembly may be manual or motorized. It may also be automatic as a function of certain circumstances, or be remote-controlled, for all or part of the electricity-supplying network of the invention.

This deflection may also be caused by a frontal or other shock, for example when the vehicle bumps violently or abnormally against the electricity-supplying assembly of the invention, thus avoiding any risk of damage to both the collecting structure of the vehicle and the aerial electricity-supplying assembly. In this case, an appropriate safety device is provided, for example a device having a fusible or resettable pin.

Other characteristics and advantages of the invention will become apparent upon reading the detailed description hereinafter, provided for an exemplary embodiment with reference to the attached drawings, wherein:

FIG. 2 is a profile view of the pivoting arm of FIG. 1 in low rest position;

FIG. 3 is a profile view of the pivoting arm of FIG. 1 in position tilted upward;

FIG. 4 is a profile view of the pivoting arm of FIG. 2 in position deflected by horizontal pivoting;

FIG. 5 is a view from above of the pivoting arm of FIG. 2;

FIG. 6 is a view from above of the pivoting arm of FIG. 3;

FIG. 7 is a view from above of the pivoting arm of FIG. 4;

FIG. 8 is a view in vertical section of the pivoting arm of FIGS. 2 and 5;

FIG. 9 is a view in vertical section of the pivoting arm of FIGS. 3 and 6;

FIG. 15 is a perspective view of a pivoting arm at right angles;

FIG. 16 is a profile view of the pivoting arm of FIG. 15; and

FIG. 17 is a face view of the pivoting arm of FIG. 15.

Figure 1:
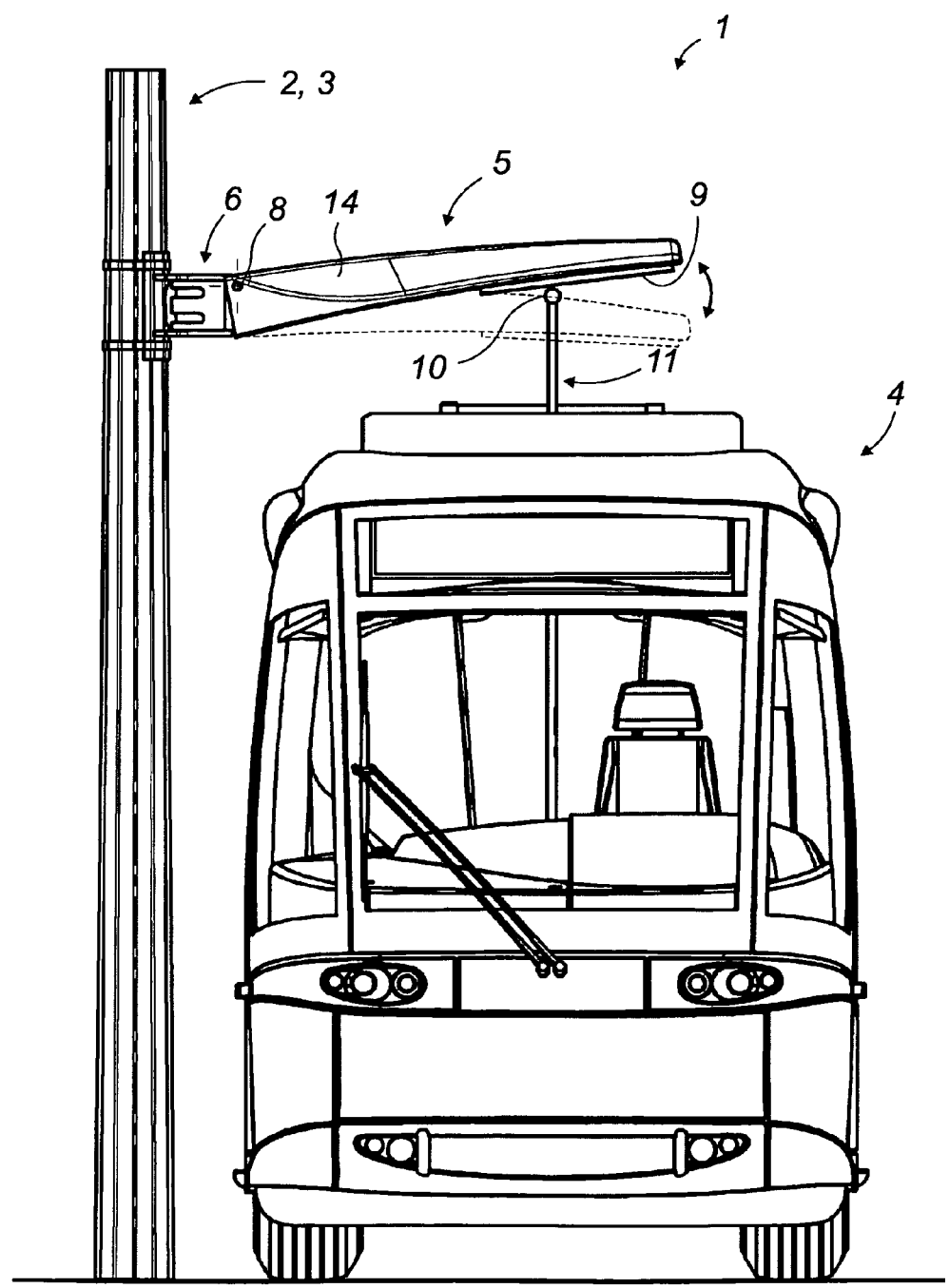
FIG. 1 is a profile view of a pivoting electricity-supplying arm according to one of the embodiments of the invention, this arm being tilted upward by the passage of a vehicle.
Figure 10:
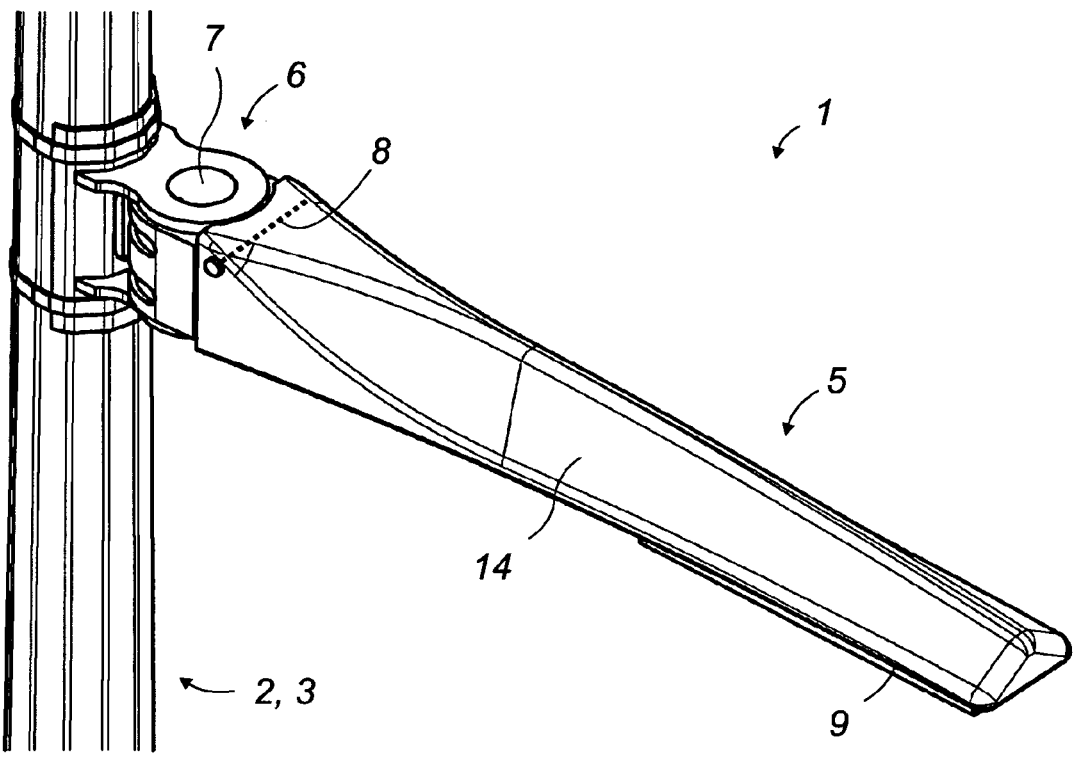
FIG. 10 is a perspective view from above of the pivoting arm of FIG. 2.
Figure 11:
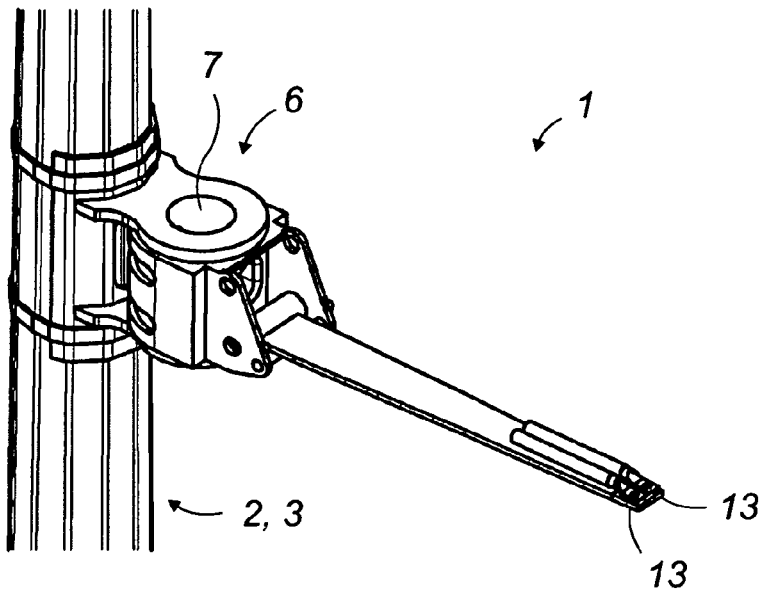
FIG. 11 is a perspective view from above of the pivoting arm of FIG. 2, in which the elements such as the covering and the electricity-supplying friction members have been removed.
Figure 12:
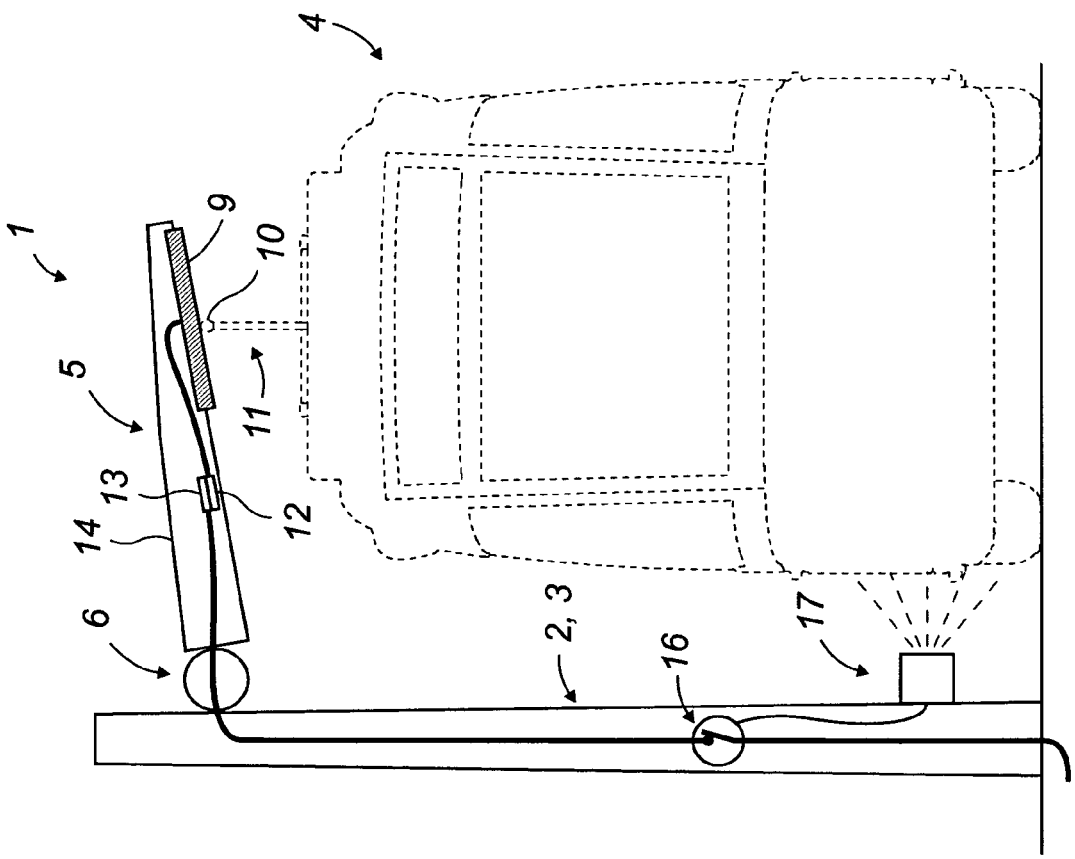
FIGS. 12 and 13 are schematic views illustrating a means of double electrical safety with vehicle proximity detection.
Figure 13:
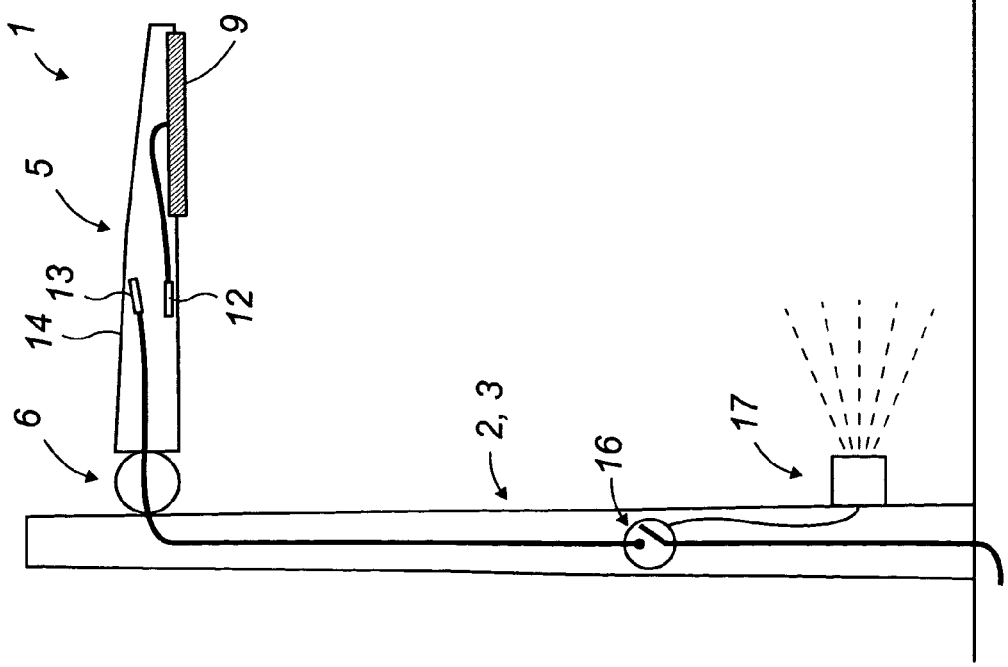

The present invention starts from the general inventive idea according to which a vehicle or a public passenger transportation train possessing a collecting structure on its roof is supplied with electrical power from an upper electricity-supplying assembly mounted on a fixed base and carrying one or more pole pieces functioning as friction members above the space of passage of the electric vehicle, the pole pieces being guided or arriving automatically in contact with the roof structure. This upper supply assembly moves from a rest position in which the friction members are not powered to a supply position in which the friction member or members are in dormant or sliding contact with the upper roof structure of the vehicle in order to deliver electrical power in motion during the passage of the vehicle underneath the electricity-supplying assembly or in stationary condition when the vehicle is immobilized underneath this electricity-supplying assembly.

For safety reasons, the electrical supply voltage is automatically cut outside collection phases.

Hereinafter there will first be described an embodiment having a pivoting electricity-supplying arm with reference to FIGS. 1 to 17. Equivalent elements shown in the different figures will be denoted by the same numerical references.

It should be clearly understood that the details of this embodiment in no way constitute a limitation but to the contrary that any imaginable variant of this preferred embodiment falls directly within the framework of the invention and therefore within its area of protection.

Pivoting electricity-supplying arm 1 is provided, for example, to be mounted on a vertical or other base 2, preferably fixed, for example on a mast, a pole, a standard lamp, a traffic light, a façade, a wall or other fixed structures. In the interests of simplification, this pivoting electricity-supplying arm 1 has been shown in the different figures as mounted on a pole 3. This is merely one example of base 2 for pivoting arm 1, and it should not be construed as a limitation. In general, base 2 on which pivoting electricity-supplying arm 1 is mounted may be any type and may have additional functions, the person skilled in the art thus being able to plan to mount pivoting arm 1 of the invention on any fixed base 2 appropriate for the situation and for the technical requirements without departing from the general inventive idea.

This base 2 must nevertheless have sufficient mechanical strength to carry pivoting electricity-supplying arm 1 firmly, as the rest position thereof must be fixed and constant regardless of the meteorological or other external forces or constraints. In addition, pivoting arm 1 is likely to be bumped violently by the passage of a vehicle or any mobile unit and even of vehicle 4 to be supplied, whether simple or articulated, with train sets or other units. In this case, it therefore must not be torn away accidentally by the passage thereof.

In general, pivoting electricity-supplying arm 1 comprises a part fixed during operation and a rigid or deformable movable part 5. The part fixed during operation may be large or may be reduced to a mechanical piece or a hinge component mounted directly on base 2 or on any other means by way of a fastening 6. This fastening 6 may preferably comprise one or more deflecting means 7 permitting the arm to be deflected from the passage space of the vehicle into a folded-back safety position.

In this way the electricity-supplying assembly according to the invention preferably comprises a deflecting hinge 7 that makes it possible to displace electricity-supplying assembly 1 or part thereof into a deflected position. Preferably it is a pivoting hinge that makes it possible to achieve this deflection by a horizontal or vertical pivoting movement.

A motor (not shown), for example remote-controlled by a control device, may be provided if necessary to assist this deflection movement.

Figure 14:
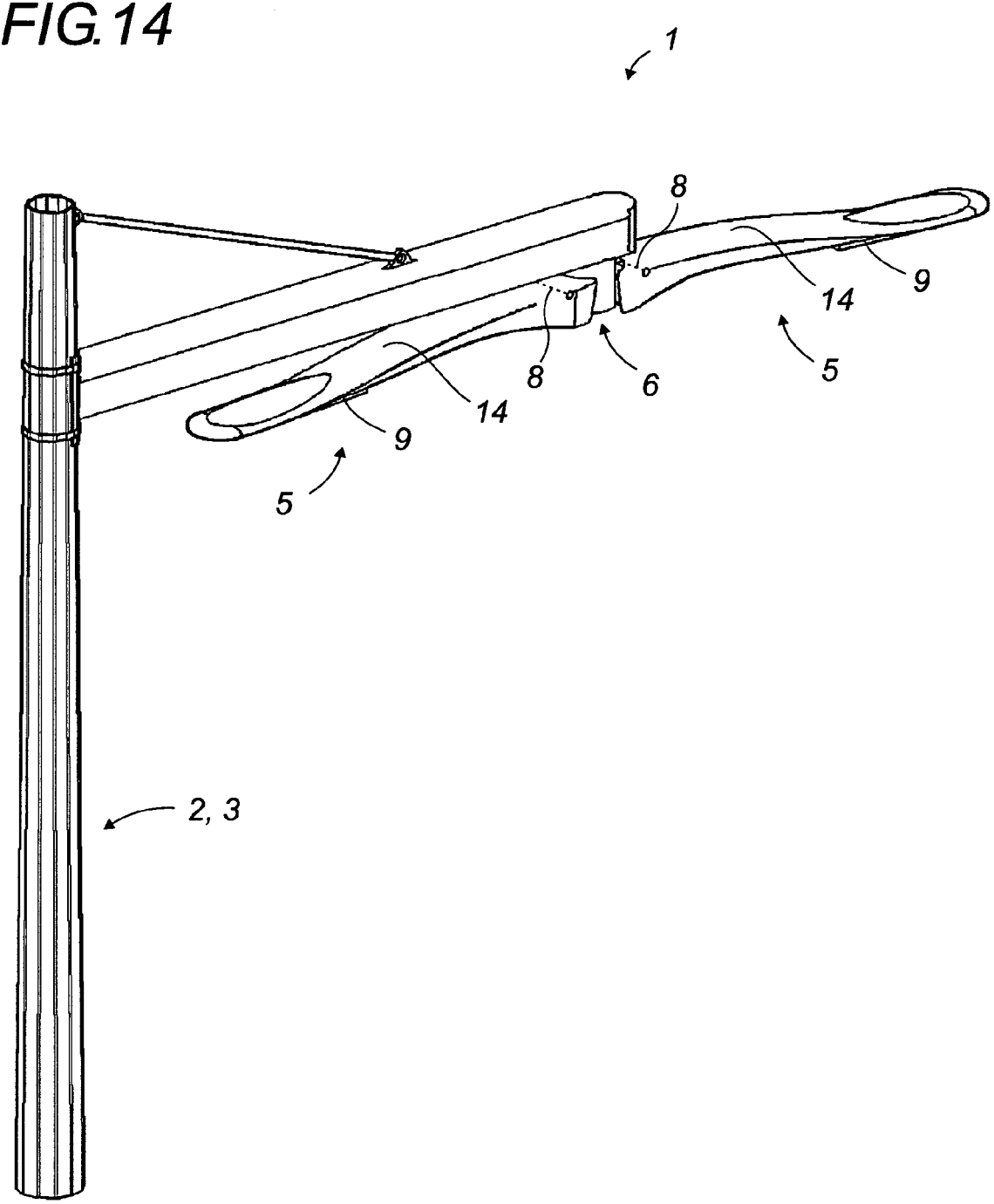
FIG. 14 is a schematic view of a double arm for two circulation roads.

The end of the arm is prolonged by a link, such as a main hinge 8 extended by movable part 5, which permits it to be displaced, for example by pivoting upward. The part of the arm fixed during operation may be lengthened to constitute a more or less long cantilever for movable part 5, thus making it possible to offset main hinge 8 outwardly relative to pole 3 or base 2 and, if need be, to shorten the length of movable part 5. Following the same kind of idea, it is possible to envision arms supporting two movable parts: one for circulation in one direction and the other for the parallel road in the opposite direction (FIG. 14).

According to the illustrated embodiment, and in general, the movable arm or part is composed of a first termination segment followed outwardly by a head supporting an electrical contact or contacts in the form of one or more friction members.

Fastening 6, which comprises deflection means 7, makes it possible to fold back pivoting electricity-supplying arm 1, for example by folding back pivotally relative to this pole. This pivoting movement may be assisted by a motor (not shown), which motor may be remote-controlled by a control device. There may also be provided a safety device such as a fusible pin, which normally blocks deflection hinge 7 in the vertical axis and which breaks under shock in order to protect the arm. A resettable device is also possible as a means of blocking by a ball forced by a spring, for example.

The arm may also be deflected manually to permit passage of a vehicle of large dimensions and especially of exceptional height.

In its movable or deformable part 5, for example at its free end, pivoting electricity-supplying arm 1 comprises one or more friction members 9 provided to come into contact with an electricity-collecting element 10 of an upper collecting structure 11, for example of the roof of electric vehicle 4, upon arrival and advance of the vehicle underneath or more generally facing the supply assembly, this contact taking place during the passage of vehicle 4 or when vehicle 4 is stationary underneath pivoting arm 1. During this passage, friction members 9 are powered with electricity-supplying voltage in order to supply vehicle 4 with electrical power either directly or via its batteries (not shown).

According to the illustrated example, power-supplying friction members 9 of pivoting electricity-supplying arm 1 are provided with contacts 12 that are not powered and remain not powered in the rest position of arm 1 but which are powered as soon as movable part 5 of pivoting arm 1 is displaced upward forcibly by electricity-collecting element 10 of upper collecting structure 11 of vehicle 4.

The friction members may have different forms. They may be one or more rectilinear rigid blocks having plane contact faces or they may be plates or a one-piece structure or a structure of blocks flexible or connected to the structure carrying them by an elastic effect suspension or mounted tiltingly or of any other appropriate form or nature.

Electricity-supplying arm 1 is provided with one or more electrical supply terminals 13 at which the electrical supply cables end. Supply terminals 13 are connected to an electrical supply (not shown), each electrical supply terminal 13 being provided at a distance from contacts 12, each of which is connected to a power-supplying friction member 9 of pivoting arm 1.

The supply assembly according to the invention may additionally comprise a protective cover 14 to protect electrical supply terminals 13 from the external environment and to avoid risks of accident by electrocution.

During the upward displacement of movable part 5 of electricity-supplying arm 1, each electrical terminal 13 comes into contact with contact 12 of friction member 9 associated therewith, so that each friction member 9 is powered at this moment and for the duration of passage of the vehicle. This establishment of contact may be achieved by displacement of supply terminal 13 or by displacement of contact 12 or by mutual convergence of these two elements 12, 13 toward one another, these displacements resulting in each case from displacement of movable part 5 or from flexion of the deformable part of electricity-supplying arm 1 caused by the presence of vehicle 4.

This is merely one exemplary embodiment in which the electrical contacts are situated in the movable part of the arm. Obviously they may be situated elsewhere, and then powering and cutting the power may be achieved differently. Powering of friction members 9 may also be tripped remotely, for example by means of a presence or proximity sensor, upon arrival of the vehicle close to the supply assembly, or in other words just before physical contact between friction members 9 and the collecting structure of the vehicle.

In the illustrated preferred example, electricity-supplying friction members 9 are mounted on an elastic suspension, for example with tilting by means of at least one pivoting support 15, for example exerting a torsional effect around the tilting axis so that contact is established progressively, not abruptly, and in the central transversal zone, since contact must always be achieved effectively flat.

Main hinge 8 of the arm and the suspension of the friction members also permit the friction members to conform correctly to the collecting track over the vehicle in all of its dynamic jolting movements. In fact, the vehicle is itself equipped with suspensions, and electrical contact must be maintained during vertical movements of the body. Similarly, the collecting track is not perfectly rectilinear and by virtue of their own suspension, the friction members are able to conform to the track while maintaining at least linear contact.

The load necessary to assure contact is given by the dead weight of the arm, but it may be compensated in the heavier or lighter direction by a spring situated close to the hinge between the arm and the fixed part. It will be possible for these movements to be damped by a telescopic shock absorber or by dry friction effects at the hinge.

While remaining in the same inventive idea, it is possible to imagine constructing the movable part as two assemblies. The first assembly is a supply head supporting or enclosing the pole pieces and the second assembly is a deformable link with elastic effect, for example flexible with elastic return to low position. As an example, there may be cited a leaf spring or any other equivalent means carried at one end by the fixed part and at the other end carrying the head equipped with the friction member or members. The elastic restoring force is such that, in supply position, the friction members are maintained in sufficient electricity-supplying contact with the collecting structure of the vehicle roof.

The arrival of the collecting structure of the vehicle roof will raise the supply head, which, because of the flexibility of the deformable link, will be constrained to bear elastically on the collecting structure of the vehicle.

In order to improve the electrical safety, electricity-supplying arm 1 may additionally comprise an automatic connection/disconnection means 16, which cuts the electrical supply, for example after a predefined time interval following passage of the vehicle, automatic connection/disconnection means 16 re-establishing the electrical supply during passage of a vehicle 4 or upon the approach thereof underneath electricity-supplying arm 1 or upon the approach thereof.

For this purpose, automatic connection/disconnection means 16 is connected to a presence or proximity detector 17 placed, for example, at the lower part of pole 3 or other base 2 for fastening of the supply arm or at another appropriate location, this detector 17 making it possible to generate, during the approach of vehicle 4 then after the passage thereof underneath electricity-supplying arm 1, a principal or supplementary signal for powering and cutting the electrical supply.

According to another variant, electricity-supplying arm 1 of the invention may additionally comprise an automatic mechanical locking/unlocking means (not shown), which automatically locks movable part 5 of electricity-supplying arm 1 in rest position, or in other words not powered, in the absence of the vehicle or after the passage thereof, and unlocks movable part 5 of the electricity-supplying arm to allow it to move into electricity-supplying contact position, for example during its lifting movement.

An additional variant is shown in FIGS. 15 to 17. According to this variant, electricity-supplying assembly 1 of the invention comprises a carrying element 18, transversal relative to fixed base 2 and mounted as a cantilever thereon by way of a fastening 6, thus constituting a bracket assembly. Carrying element 18, preferably rectilinear, carries at its free end movable or deformable part 5 of electricity-supplying assembly 1 at right angles by way of a pivoting hinge 8.

According to this variant, in rest and use position of electricity-supplying assembly 1, carrying element 18 is disposed in transversal position relative to the road, while movable part 5 of electricity-supplying assembly 1 is parallel to the road. Thus, in rest and use position, power-supplying friction members 9 are perpendicular to the road and parallel to carrying element 18.

According to this variant, fastening 6 may be provided with pivoting hinge 7, permitting deflection of electricity-supplying assembly 1 of the invention. This pivoting hinge 7 may be provided, for example, to cause carrying element 18 to pivot by 90°, so that it becomes parallel to the road, or, for example, to cause carrying element 18 to pivot by 180°, so that it becomes perpendicular to the road but on the side opposite thereto.

Obviously the invention is not limited to the preferred embodiments described in the foregoing and shown in the different figures, the person skilled in the art being capable of making numerous modifications thereto and of imagining other variants without departing from the scope or the framework of the invention defined by the claims.

For example, the longitudinal axis may become transversal while keeping the friction members perpendicular to the general axis of the collection line on the electric vehicle.

For example, in the case in which it is wished that two vehicles situated side-by-side on two circulation roads can be supplied simultaneously and from the same fixed base, it is possible to provide an electrical supply assembly according to the invention that has at least two friction members or two assemblies of friction members 9 spaced apart from one another by a distance at least equal to the width of one vehicle, as illustrated in FIG. 14.

In addition, pivoting arm 1 may be provided with other means, such as, for example, means for lighting the highway. Similarly, the use of the fastening base on which the pivoting arm of the invention is mounted may also have other functions or be provided with other devices, such as lighting means, power lines, microwave relays and other components.

Within the framework of the present invention it is also possible to envision an embodiment in which the support for pole pieces is always perpendicular to the direction of advance of the vehicle, but according to which this support can be moved between a rest position and a supply position by tilting around an axis not parallel to the vehicle but perpendicular to the direction of advance thereof.

As in the foregoing, the movable part may be constructed in two assemblies, one in the form of a head supporting the pole piece or pieces and the other in the form of a rigid or deformable link or a deformable link with elastic effect with downward restoring force.

In this embodiment, it is preferably the upward ramp of the front end of the roof structure which, by virtue of its advance, will push the pole piece or pieces with their support in tilting manner to bring them into their electricity-supplying position.

The invention claimed is:

1. An electricity-supplying assembly for providing electricity to ground vehicles travelling along a road, comprising:
 an elevated support disposed adjacent to the road along which the ground vehicle is travelling;
 a substantially horizontally oriented arm having a predetermined longitudinal extent, mounted upon said elevated support and extending perpendicular to said elevated support so as to extend in a transverse direction across, over, and above the road along which the ground vehicle is travelling, and having a movable portion which is movably mounted upon said arm between a first lowered rest position at which said movable portion is disposed when a ground vehicle is not present beneath said movable portion of said arm, and a second raised supply position at which said movable portion is disposed when a ground vehicle is present beneath said movable portion of said arm;
 friction structure having a predetermined longitudinal extent and mounted upon said movable portion of said arm such that said predetermined longitudinal extent of said friction structure likewise extends transversely with respect to the road along which the ground vehicle is travelling;

electrical supply structure disposed within said movable portion of said arm for supplying electricity to said friction structure disposed upon said movable portion of said arm; and electrical collector structure carried by the ground vehicle for operative engagement with said friction structure carried upon said arm for conducting electricity from said electrical supply structure disposed within said movable portion of said arm to the ground vehicle;

said electrical supply structure disposed within said movable portion of said arm comprising a pair of electrical contacts which are spaced from each other when said movable portion of said arm is disposed at said first lowered rest position when a ground vehicle is not present beneath said movable portion of said arm such that electricity is not supplied to said friction structure, and are disposed in contact with each other when said movable portion of said arm is disposed at said second raised supply position when a ground vehicle is present beneath said movable portion of said arm such that electricity is able to be supplied to said friction structure mounted upon said movable portion of said arm and to said electrical collector structure carried by the ground vehicle.

2. The electricity-supplying assembly according to claim 1, wherein:
said movable portion of said arm pivots around an axis substantially parallel to the road.

3. The electricity-supplying assembly according to claim 2, wherein:
said movable portion of said arm is hingedly secured to said elevated support by means of a fastening fixedly secured to said elevated support and a deflecting hinge connected to said fastening.

4. The electricity-supplying assembly according to claim 1, wherein:
said movable portion of said arm has a leaf spring operatively associated therewith for returning said movable portion of said arm from said second raised supply position to said first lowered rest position.

5. The electricity-supplying assembly according to claim 1, wherein:
said friction structure is flexibly connected to said movable portion of said arm.

6. The electricity-supplying assembly according to claim 1, wherein:
said electrical supply structure further comprises a connection/disconnection electrical assembly for automatically supplying said friction structure with electricity and for terminating electricity to said friction structure according to the presence or absence of the vehicle within the vicinity of said arm.

7. The electricity-supplying assembly according to claim 6, wherein:
said automatic connection/disconnection electrical assembly cuts the electrical supply after a predefined time interval following passage of the vehicle and re-establishes the electrical supply upon the approach of the vehicle.

8. The electricity-supplying assembly according to claim 7, wherein:
said automatic connection/disconnection electrical assembly is electrically connected to a detector for detecting the proximity or absence of the vehicle.

9. The electricity-supplying assembly according to claim 1, wherein:
said arm additionally comprises a protective cover that protects the electrical supply structure from the external environment and limits the risks of electrocution.

10. The electricity-supplying assembly according to claim 1, wherein:
said arm comprises a proximal end portion fixedly connected to said elevated support, and a distal end portion mounted in a cantilevered manner with respect to said elevated support;
said movable portion comprises a second arm fixedly secured at a first end portion thereof to said distal end portion of said arm and having a longitudinal extent disposed perpendicular to said arm so as to be disposed substantially parallel to the road; and
said friction structure is mounted upon a second end portion of said second arm and extends substantially perpendicular to said longitudinal extent of said second arm so as to be disposed transversely with respect to the road.

11. The electricity-supplying assembly according to claim 1, wherein:
said arm comprises a proximal end portion fixedly connected to said elevated support, and a distal end portion mounted in a cantilevered manner with respect to said elevated support;
said movable portion comprises a second arm fixedly secured at a first end portion thereof to said distal end portion of said arm;
said friction structure is mounted upon a second end portion of said second arm; and
a hinge mechanism operatively interconnects said second arm to said arm such that said second arm is pivotally movable about a vertical axis between a first position at which said second arm, and said friction structure carried thereby, is disposed beneath said arm so as to engage the electrical collector structure of the ground vehicle when the ground vehicle is moving along the lane of the road, and a second structure, disposed 180° opposite said first position, at which said second arm, and said friction structure carried thereby, effectively defines an extension of said arm so as to be disposed transversely across a second adjacent lane of the road along which a ground vehicle is travelling.

12. The electricity-supplying assembly according to claim 1, wherein:
said arm comprises a proximal end portion fixedly connected to said elevated support, and a distal end portion mounted in a cantilevered manner with respect to said elevated support;
said movable portion comprises a pair of second arms fixedly secured at first end portions thereof to said distal end portion of said arm and extending outwardly in opposite directions from said distal end portion of said arm and extending transversely with respect to and across the road so as to be disposed two adjacent lanes of the road in order to service two ground vehicles; and
friction structure is mounted upon a second end portion of each one of said second arms so as to provide electricity to each one of the two ground vehicles.

13. An electricity-supplying assembly for providing electricity to ground vehicles travelling along a road, comprising:
an elevated support disposed adjacent to the road along which the ground vehicle is travelling;
a substantially horizontally oriented arm having a predetermined longitudinal extent, mounted upon said elevated support and extending perpendicular to said elevated support so as to extend in a transverse direction across, over, and above the road along which the ground vehicle is travelling, and having a movable portion which is movably mounted upon said arm between a first lowered rest position at which said movable portion is disposed when a ground vehicle is not present beneath said movable portion of said arm, and a second raised supply position at which said movable portion is disposed when a ground vehicle is present beneath said movable portion of said arm;

friction structure having a predetermined longitudinal extent and mounted upon said movable portion of said arm such that said predetermined longitudinal extent of said friction structure likewise extends transversely with respect to the road along which the ground vehicle is travelling;

electrical supply structure disposed within said movable portion of said arm for supplying electricity to said friction structure disposed upon said movable portion of said arm; and electrical collector structure carried by the ground vehicle for operative engagement with said friction structure mounted upon said movable portion of said arm for conducting electricity, from said electrical supply structure of said movable portion of said arm to the ground vehicle;

said electrical supply structure disposed within said movable portion of said arm comprising a pair of electrical contacts which are spaced from each other when said movable portion of said arm is disposed at said first lowered rest position when a ground vehicle is not present beneath said movable portion of said arm such that electricity is not supplied to said friction structure, and which are disposed in contact with each other when said movable portion of said arm is disposed at said second raised supply position as a result of said movable portion of said arm being automatically moved to said second raised supply position when said electrical collector structure of the ground vehicle engages said friction structure mounted upon said movable portion of said arm as a result of the ground vehicle being present beneath said movable portion of said arm, whereby electricity is able to be supplied to said friction structure mounted upon said movable portion of said arm and to said electrical collector structure carried by the ground vehicle.

14. The electricity-supplying assembly according to claim 13, wherein:
said movable portion of said arm pivots around an axis substantially parallel to the road.

15. The electricity-supplying assembly according to claim 14, wherein:
said movable portion of said arm is hingedly secured to said elevated support by means of a fastening fixedly secured to said elevated support and a deflecting hinge connected to said fastening.

16. The electricity-supplying assembly according to claim 13, wherein:
said movable portion of said arm has a leaf spring operatively associated therewith for returning said movable portion of said arm from said second raised supply position to said first lowered rest position.

17. The electricity-supplying assembly according to claim 13, wherein:
said friction structure is flexibly connected to said movable portion of said arm.

18. The electricity-supplying assembly according to claim 13, wherein:
said electrical supply structure further comprises a connection/disconnection electrical assembly for automatically supplying said friction structure with electricity and for terminating electricity to said friction structure according to the presence or absence of the vehicle within the vicinity of said arm.

19. The electricity-supplying assembly according to claim 18, wherein:
said automatic connection/disconnection electrical assembly cuts the electrical supply after a predefined time interval following passage of the vehicle and re-establishes the electrical supply upon the approach of the vehicle.

20. The electricity-supplying assembly according to claim 19, wherein:
said automatic connection/disconnection electrical assembly is electrically connected to a detector for detecting the proximity or absence of the vehicle.

21. The electricity-supplying assembly according to claim 13, wherein:
said arm additionally comprises a protective cover that protects the electrical supply structure from the external environment and limits the risks of electrocution.

22. The electricity-supplying assembly according to claim 13, wherein:
said arm comprises a proximal end portion fixedly connected to said elevated support, and a distal end portion mounted in a cantilevered manner with respect to said elevated support;
said movable portion comprises a second arm fixedly secured at a first end portion thereof to said distal end portion of said arm and having a longitudinal extent disposed perpendicular to said arm so as to be disposed substantially parallel to the road; and
said friction structure is mounted upon a second end portion of said second arm and extends substantially perpendicular to said longitudinal extent of said second arm so as to be disposed transversely with respect to the road.

23. The electricity-supplying assembly according to claim 13, wherein:
said arm comprises a proximal end portion fixedly connected to said elevated support, and a distal end portion mounted in a cantilevered manner with respect to said elevated support;
said movable portion comprises a second arm fixedly secured at a first end portion thereof to said distal end portion of said arm;
said friction structure is mounted upon a second end portion of said second arm; and
a hinge mechanism operatively interconnects said second arm to said arm such that said second arm is pivotally movable about a vertical axis between a first position at which said second arm, and said friction structure carried thereby, is disposed beneath said arm so as to engage the electrical collector structure of the ground vehicle when the ground vehicle is moving along the lane of the road, and a second structure, disposed 180° opposite said first position, at which said second arm, and said friction structure carried thereby, effectively defines an extension of said arm so as to be disposed transversely across a second adjacent lane of the road along which a ground vehicle is travelling.

24. The electricity-supplying assembly according to claim 13, wherein:
- said arm comprises a proximal end portion fixedly connected to said elevated support, and a distal end portion mounted in a cantilevered manner with respect to said elevated support;
- said movable portion comprises a pair of second arms fixedly secured at first end portions thereof to said distal end portion of said arm and extending outwardly in opposite directions from said distal end portion of said arm and extending transversely with respect to and across the road so as to be disposed two adjacent lanes of the road in order to service two ground vehicles; and
- friction structure is mounted upon a second end portion of each one of said second arms so as to provide electricity to each one of the two ground vehicles.

\* \* \* \* \*